United States Patent
Irzinger

(10) Patent No.: US 7,938,219 B2
(45) Date of Patent: May 10, 2011

(54) METHOD FOR DAMPING AXIAL SHOCKS ONTO A DRIVER'S LOWER EXTREMITY

(75) Inventor: Albert Irzinger, Moosthenning (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/643,967

(22) Filed: Dec. 22, 2006

(65) Prior Publication Data

US 2007/0102221 A1 May 10, 2007

Related U.S. Application Data

(63) Continuation of application No. PCT/EP2005/006411, filed on Jun. 15, 2005.

(30) Foreign Application Priority Data

Jun. 23, 2004 (DE) .................. 10 2004 030 267

(51) Int. Cl.
*B60R 21/00* (2006.01)
(52) U.S. Cl. .................................. 180/274; 701/45
(58) Field of Classification Search .......... 180/271, 180/274; 280/735; 92/140, 84; 701/45
See application file for complete search history.

(56) References Cited

U.S. PATENT DOCUMENTS

| | | | | |
|---|---|---|---|---|
| 3,719,123 A * | 3/1973 | Cripe | ............... | 91/391 R |
| 3,732,944 A * | 5/1973 | Kendall | ............... | 180/274 |
| 5,193,640 A * | 3/1993 | Lee | ............... | 180/271 |
| 5,398,775 A * | 3/1995 | Lee | ............... | 180/274 |
| 5,544,915 A * | 8/1996 | Fendt et al. | ............... | 280/735 |
| 5,568,797 A * | 10/1996 | Landerretche | ............... | 123/396 |
| 5,632,184 A * | 5/1997 | Callicutt et al. | ............... | 74/512 |
| 5,848,558 A * | 12/1998 | Isono et al. | ............... | 74/512 |
| 6,182,525 B1 * | 2/2001 | Bowers et al. | ............... | 74/512 |
| 6,719,083 B2 * | 4/2004 | Ono | ............... | 180/274 |
| 6,752,038 B2 * | 6/2004 | Cordero | ............... | 74/512 |
| 6,758,129 B2 * | 7/2004 | Dreischarf et al. | ............... | 92/84 |
| 7,093,515 B2 * | 8/2006 | Yamanoi et al. | ............... | 74/513 |
| 7,162,349 B2 * | 1/2007 | Hijikata et al. | ............... | 701/70 |
| 2002/0096383 A1 * | 7/2002 | Hirata | ............... | 180/271 |
| 2003/0200863 A1 | 10/2003 | Dreischarf et al. | | |

FOREIGN PATENT DOCUMENTS

| | | |
|---|---|---|
| DE | 196 34 257 A1 | 3/1997 |
| DE | 197 27 598 A1 | 1/1999 |
| DE | 197 52 231 A1 | 5/1999 |
| DE | 199 38 272 A1 | 2/2001 |
| EP | 0 983 912 B1 | 3/2000 |

OTHER PUBLICATIONS

International Search Report dated Oct. 26, 2005 with an English translation of the pertinent portion (Four (4) pages).
German Office Action dated Nov. 19, 2004 with an English translation of the pertinent portion (Seven (7) pages).

* cited by examiner

*Primary Examiner* — Paul N Dickson
*Assistant Examiner* — Timothy D Wilhelm
(74) *Attorney, Agent, or Firm* — Crowell & Moring LLP

(57) ABSTRACT

A method of damping axial shocks which affect a driver's lower extremity situated on an accelerator, when the vehicle impacts on an obstacle is provided. In this case, by way of a device for generating an adjustable restoring force applied to the accelerator, in response to an accident-detection signal of a control device, a defined restoring force is generated and applied to the accelerator.

5 Claims, 1 Drawing Sheet

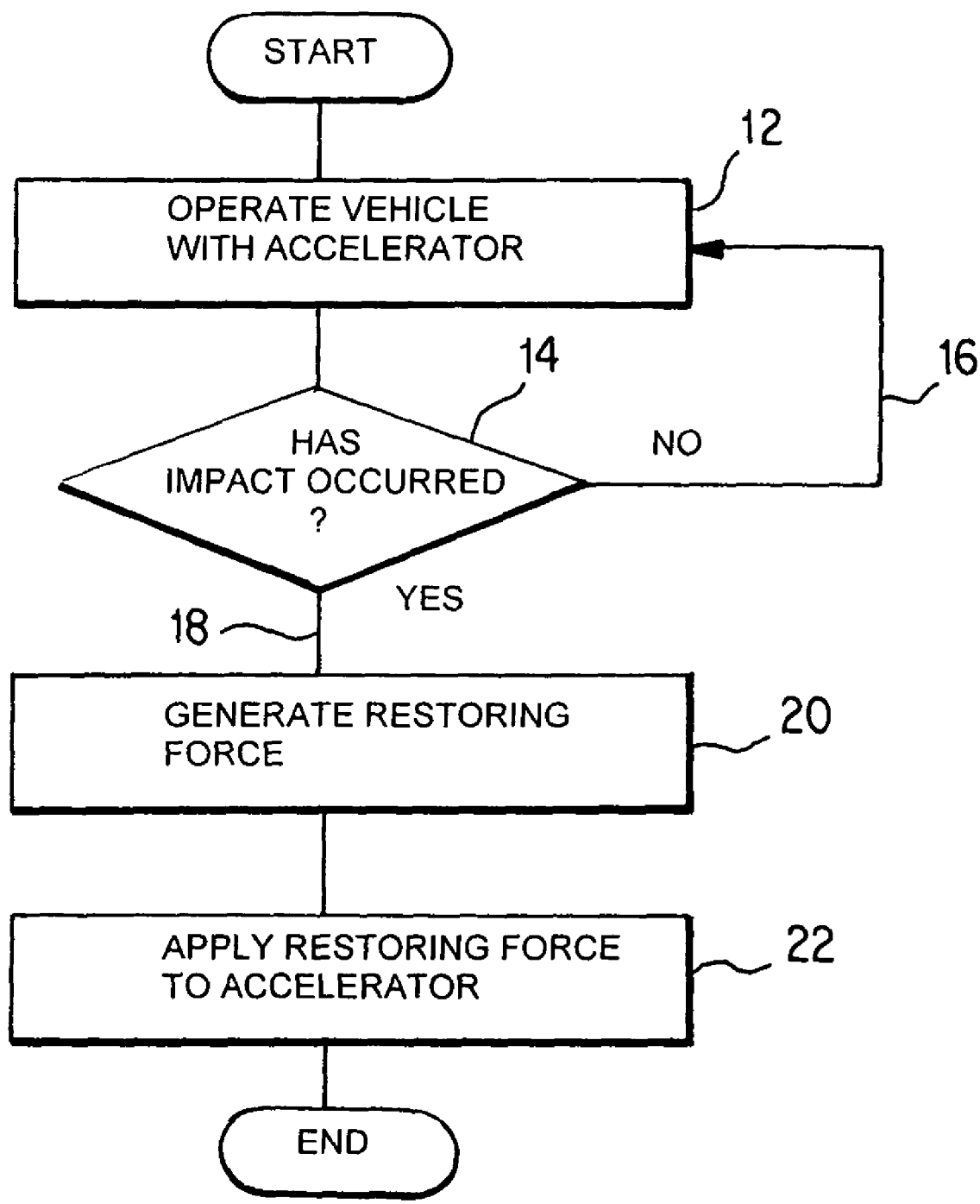

METHOD FOR DAMPING AXIAL SHOCKS ONTO A DRIVER'S LOWER EXTREMITY

CROSS-REFERENCE TO RELATED APPLICATIONS

This application is a continuation of PCT International Application No. PCT/EP2005/006411, filed on Jun. 15, 2005, which claims priority under 35 U.S.C. §119 to German Application No. 10 2004 030 267.7, filed Jun. 23, 2004, the entire disclosures of which are expressly incorporated by reference herein.

BACKGROUND AND SUMMARY OF THE INVENTION

The invention relates to a method of damping axial shocks, which affects the lower extremity of a driver situated on an accelerator when a vehicle impacts an obstacle.

In the event of an impact of a vehicle or a frontal collision, the driver normally experiences considerable loads onto the lower extremities as a result of the driver's forward displacement and the simultaneous rearward displacement of the engine. The driver's forward displacement forces his legs to impact the leg room compartment with a very high energy, while that energy being hardly or not at all braked. It is known to arrange damping foam elements in the area of the driver's and front passenger's leg room in order to reduce the high impact of the legs. However, this measure cannot be implemented in the area behind the accelerator because the accelerator should have a firm end stop.

It is therefore an object of the invention to provide a method of damping axial shocks which affect a driver's lower extremity situated on an accelerator when a vehicle impacts against an obstacle.

According to the invention, this object is achieved by providing a method of damping axial shocks which affect a driver's lower extremity situated on an accelerator when the vehicle impacts against an obstacle, wherein, by way of a device for generating an adjustable restoring force applied to the accelerator, in response to an accident-detection signal of a control device, a defined restoring force is generated and applied to the accelerator. Advantageous further developments of the invention are described and claimed herein.

Other objects, advantages and novel features of the present invention will become apparent from the following detailed description of the invention when considered in conjunction with the accompanying drawings.

BRIEF DESCRIPTION OF THE DRAWING

The FIGURE is a flow chart illustrating the method of damping axial shocks according to the present invention.

DETAILED DESCRIPTION OF THE DRAWING

Referring to the FIGURE, there is shown an exemplary method of damping axial shocks which affect a driver's lower extremity that is situated on an accelerator during a vehicle impact. Upon starting, a vehicle having an accelerator, such as a gas pedal, is operated via a lower extremity of a driver (step 12). The method determines (step 14) whether an impact has occurred, for example via an accident-detection signal produced by a known trigger signal for an air bag or seatbelt tightener. If an impact has occurred ("yes" line 18), then a defined restoring force is generated by an adjustable restoring force device (step 20). The defined restoring force is applied to the accelerator so as to convert the impact energy from the driver's lower extremity (step 22).

Thus, the method according to the invention for damping axial shocks or forces which affect a driver's lower extremity that is situated on an accelerator when the vehicle impacts an obstacle provides that, in response to an accident-detection signal from a control device, a defined restoring force in generated and applied to the accelerator by way of a device for generating an adjustable restoring force.

Devices for accelerators are known by which an adjustable restoring force upon the accelerator can be generated. Such a device may indicate, for example, to the driver, as a result of an adjustable restoring force, the required position of the accelerator for reaching a defined speed. According to the method of the invention, however, such a device is used advantageously for generating a defined restoring force upon an accelerator in the event of an impact of the vehicle. If the driver has his leg or his foot on the accelerator and his vehicle becomes involved, for example, in a frontal collision with another vehicle, an accident-detection signal is triggered in a control device. In response to this signal, a defined restoring force is applied to the accelerator, which force acts against the force of the driver's foot. As a result, the accelerator remains approximately in the current position. Because of the restoring force, the leg situated on the accelerator encounters increased resistance. The driver's energy generated by the impact is thus transmitted to the accelerator and absorbed by the restoring force acting upon the accelerator.

Depending on the intensity of the impact or of the driver's energy generated by the impact, the accelerator, as a result of the driver's energy, because of a force-path energy conversion, may also be moved against the restoring force. The hard force peak of the impact during otherwise customary punching through of the pedal path may thereby be considerably reduced or even prevented if all the driver's energy onto the accelerator can be converted by the restoring force.

For reasons of completeness, reference is also made to German Patent document DE 197 52 231 A1, from which a motor vehicle brake system is known having a brake pedal and a force leverage arrangement linked to the brake pedal. In the case of an accident, in order to prevent the driver's foot from being squeezed in within the endangered leg room of the vehicle, a vacuum brake power boosting unit-master brake cylinder combination is provided in the motor vehicle brake system. In an accident, the reduction of the boosting force leads to a restoring movement of the accelerator. As a result, the foot is actively pushed out of the particularly endangered leg room, and the object is achieved of minimizing the risk that the driver's feet are squeezed in within the leg room.

Advantageously, the accident-detection signal is an airbag-triggering signal or a signal which triggers the belt tighteners, was has the advantage that no separate signal has to be generated, but rather a signal which is generated in any event can be used for the method according to the invention.

In addition, the defined restoring force is advantageously a maximal restoring force which the device for generating the restoring force can expend. The higher the restoring force, the more energy can be converted and the more the force peak can be reduced during the punching-through of the accelerator.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of damping shocks affecting a vehicle driver's lower extremity that is situated on an accelerator during a vehicle impact, comprising:

detecting the vehicle impact via an accident-detection signal; and actuating an accelerator positioning device operatively connected to the accelerator to generate and apply a defined restoring force upon the accelerator during the vehicle impact in response to the accident-detection signal so as to counteract air force applied by the vehicle drive's lower extremity upon the accelerator during the vehicle impact and retain the accelerator substantially in its pre-impact position against transmitted impact energy.

2. The method according to claim 1, wherein the accident-detection signal is an airbag-triggering signal.

3. The method according to claim 1, wherein the accident-detection signal is a seat belt tightener-triggering signal.

4. The method according to claim 1, wherein the defined restoring force is a maximal restoring force.

5. The method according to claim 2, wherein the defined restoring force is a maximal restoring force.

* * * * *